US010189330B1

(12) United States Patent
Wurzer et al.

(10) Patent No.: US 10,189,330 B1
(45) Date of Patent: Jan. 29, 2019

(54) AUXILIARY AIR CONDITIONING SYSTEM FOR A SLEEPER CAB OF A TRUCK

(71) Applicants: Adam J. Wurzer, Carroll, IA (US); Terry D. Wurzer, Panora, IA (US); David T. Wurzer, Carroll, IA (US)

(72) Inventors: Adam J. Wurzer, Carroll, IA (US); Terry D. Wurzer, Panora, IA (US); David T. Wurzer, Carroll, IA (US)

( * ) Notice: Subject to any disclaimer, the term of this patent is extended or adjusted under 35 U.S.C. 154(b) by 99 days.

(21) Appl. No.: 15/298,866

(22) Filed: Oct. 20, 2016

(51) Int. Cl.
*B60H 1/00* (2006.01)

(52) U.S. Cl.
CPC ..... *B60H 1/00428* (2013.01); *B60H 1/00328* (2013.01); *B60H 1/00364* (2013.01); *B60H 1/00564* (2013.01)

(58) Field of Classification Search
CPC .............. B60H 1/00428; B60H 1/3222; B60H 1/00378; B60H 1/00778
See application file for complete search history.

(56) References Cited

U.S. PATENT DOCUMENTS

| 6,932,148 | B1 * | 8/2005 | Brummett | B60H 1/00378 123/142.5 R |
| 2005/0210903 | A1 * | 9/2005 | Allen | B60H 1/00378 62/244 |
| 2007/0221370 | A1 * | 9/2007 | Allen | B60H 1/00428 165/202 |

* cited by examiner

*Primary Examiner* — Cassey D Bauer
(74) *Attorney, Agent, or Firm* — Dennis L. Thomte; Thomte Patent Law Office LLC

(57) ABSTRACT

An auxiliary alternating current air conditioning system for a sleeper cab of a truck which is driven by the truck direct current battery system. The auxiliary alternating current air conditioning system is functional only when the truck engine is not running. The auxiliary alternating current air conditioning system will shut down when the voltage of the direct current battery system of the truck reaches a predetermined level. A second embodiment of the auxiliary air conditioning system is disclosed wherein the auxiliary air conditioning system is direct current driven rather than alternating current driven.

2 Claims, 5 Drawing Sheets

AUXILIARY AIR CONDITIONING SYSTEM FOR A SLEEPER CAB OF A TRUCK

BACKGROUND OF THE INVENTION

Field of the Invention

This invention relates to an auxiliary air conditioning system for a sleeper cab of a truck and more particularly to an auxiliary air conditioning system for a sleeper cab of a truck which is selectively powered by the batteries of the truck only when the engine of the truck is not running.

Description of the Related Art

A large majority of the over the road trucks in operation today have sleeper cabs which are at the rearward end of the operator's cab. During the operation of the truck, the conventional air conditioning system of the truck is driven by the engine of the truck to cool the operator's cab and the sleeper cab. When the truck is parked to enable the driver of the truck to sleep or rest, the engine of the truck must be idled to provide power to the air conditioning system of the truck. The idling of the truck during the time that the driver is sleeping or resting in the sleeper cab results in considerable fuel usage. Further, some states now have laws which prevent trucks from idling through the night or the like due to air pollution concerns.

Attempts have been made to air condition the sleeper cab of the truck during the times that the engine of the truck is not running. However, the prior art attempts to provide such air conditioning has required the use of a battery separate from the truck batteries. In that prior art system, there is no way to drive an alternating current air conditioner since the battery is of the direct current type. Further, the use of a separate battery in the prior art devices requires that space be provided for the battery. Further, the prior art battery system is believed to provide a limited amount of air conditioning time. Further, the prior art devices have no means to deactivate the air conditioning system prior to the battery being completely discharged. Further, the use of a separate battery to run the air conditioning system requires a separate charging system for the battery.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

Two embodiments of an auxiliary air conditioning system are disclosed for a sleeper cab of a truck. In both embodiments, the truck has an engine, a direct current battery system, a conventional air conditioning system operated by the engine, an operator's cab having a rearward end, and a sleeper cab at the rearward end of the operator's cab with the sleeper cab having an interior, a first side wall, a second side wall, a rear wall with interior and exterior sides, a floor and a bunk bed positioned above the floor of the sleeper cab.

In the first embodiment of the invention, the auxiliary alternating current air conditioning system supplies cool air to the interior of the sleeper cab only when the truck engine is not running. The auxiliary alternating current air conditioning system of this invention includes a direct current condenser and fan mounted on the exterior side of the rear wall of the sleeper cab. An alternating current air conditioner unit is mounted on the floor or other areas of the sleeper cab below the bunk bed. The direct current condenser and fan are operatively connected to the alternating current air conditioner unit. An electrical inverter is provided in the interior of the sleeper cab which is electrically connected to the truck direct current battery system for inverting direct current electricity from the direct current battery system of the truck to alternating current electricity. The inverter is electrically connected to the air unit for supplying alternating current thereto. An auxiliary control is operatively connected to the air unit for controlling the operation of the air unit. An inverter control is electrically connected to the inverter for controlling the inverter. The air unit has at least one cool air conduit extending therefrom into the interior of the sleeper cab.

In the second embodiment of the invention, the auxiliary air conditioning system is of the direct current type and only runs when the truck engine is not running. The condenser, fan and air conditioning unit are supplied direct current power from the direct current battery system of the truck. A low voltage control is provided to deactivate the condenser, fan and air conditioning unit when the voltage in the truck battery system drops to a predetermined level to ensure that the truck battery system will have enough remaining power to start the truck engine.

In each of the embodiments, the inverter control includes means for deactivating the inverter and the auxiliary air conditioning system upon the voltage in the direct current battery system of the truck dropping to a predetermined level. In both of the embodiments, the air unit is deactivated when the truck engine is running thereby deactivating the air unit, the condenser and the fan.

It is therefore a principal object of the invention to provide an auxiliary air conditioning system for a sleeper cab of a truck.

A further object of the invention is to provide a system of the type described which derives its power from the direct current battery system of the truck.

A further object of the invention is to provide an invention of the type described wherein an inverter converts or inverts the direct current electricity of the truck battery system to alternating current and supplies the same to an air conditioning unit.

A further object of the invention is to provide a system of the type described wherein the auxiliary air conditioning system is shut down when the voltage in the truck battery system drops to a predetermined level.

A further object of the invention is to provide a system of the type described which will only operate when the engine of the truck is not running.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
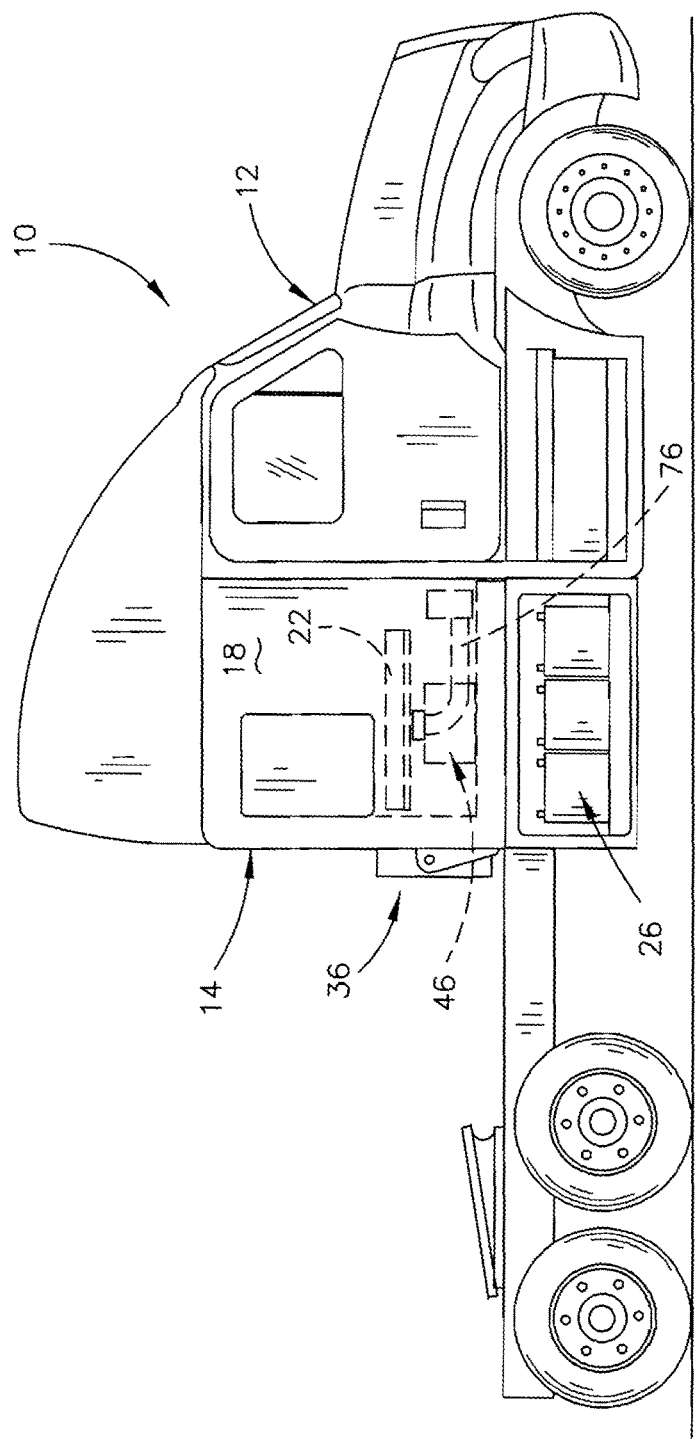
FIG. 1 is a side elevational view of a truck having a sleeper cab which is cooled by the first embodiment of the auxiliary air conditioning system of this invention.
Figure 2:
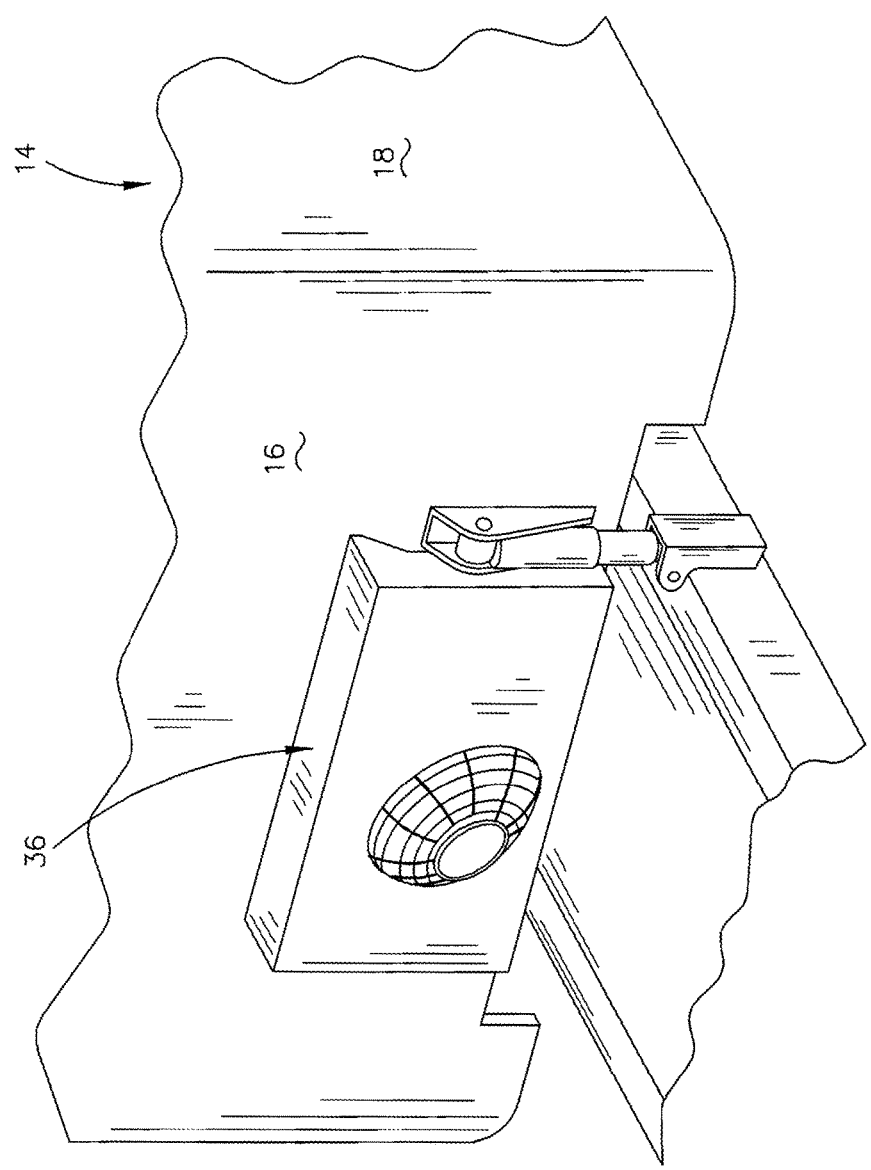
FIG. 2 is a partial rear perspective view of the sleeper cab of FIG. 1 which illustrates the condenser of the first embodiment of the auxiliary air conditioning system mounted on the rear of the sleeper cab.
Figure 3:
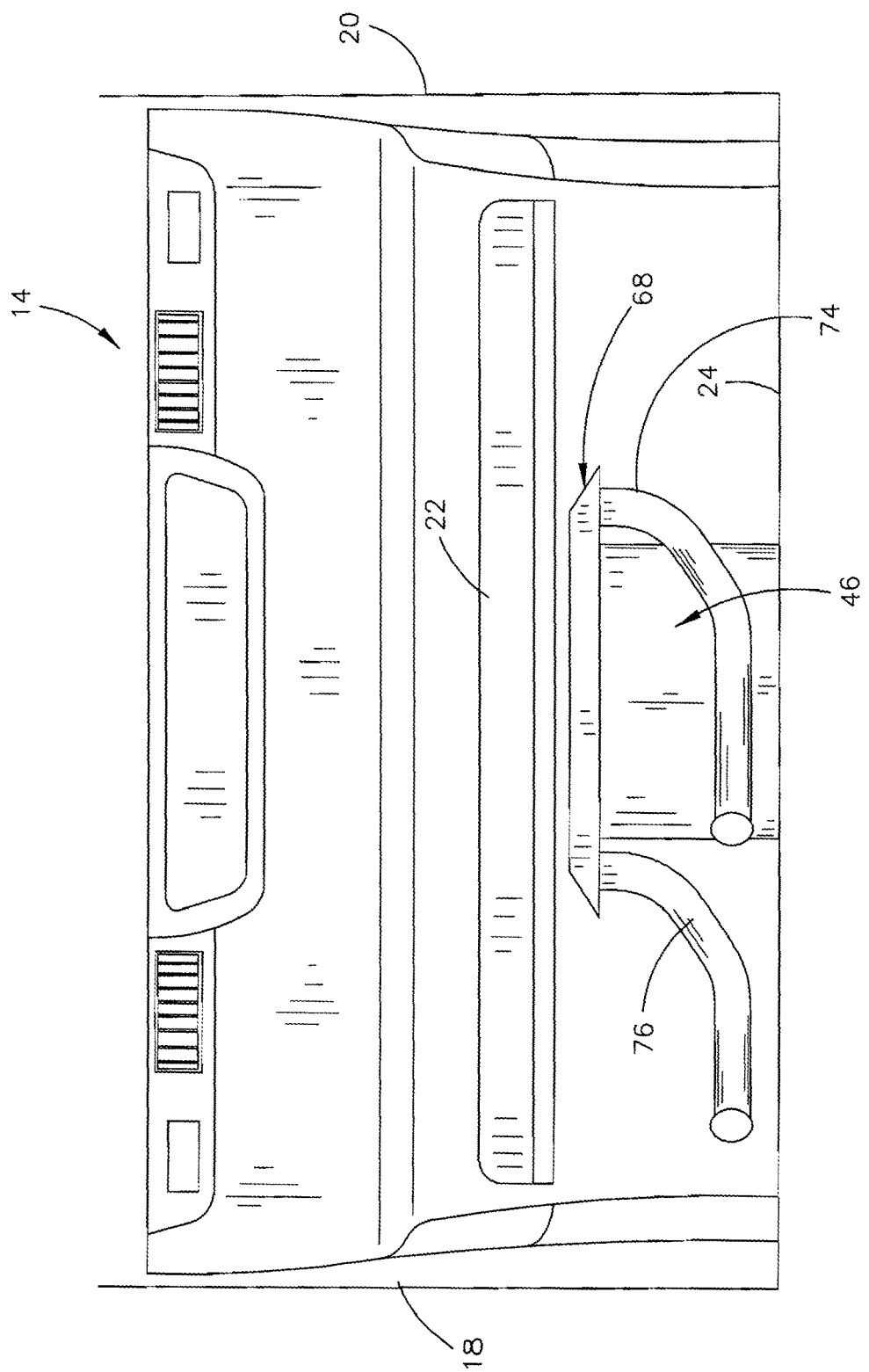
FIG. 3 is a partial front view of the sleeper cab of FIGS. 1 and 2 which illustrates the air unit of the first embodiment of the auxiliary air conditioning system positioned below the bunk bed of the sleeper cab.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional over the road truck which includes an engine, an operator's cab 12, and a sleeper cab 14. Sleeper cab 14 has a back wall 16 and side walls 18 and 20. Sleeper cab 14 includes a bunk or bed 22 which is positioned above the floor 24 of the sleeper cab 14. Truck 10 includes a direct current battery system 26 which is usually located below the driver's door. The truck 10 includes a conventional air conditioning system (not shown) which is only driven when the engine of the truck is running. The conventional air conditioning system of the truck 10 usually includes cool air ducts and which receive cool air from the truck air conditioner to deliver cool air to the interior of the sleeper cab 14 and the operator's cab 12.

The first embodiment of the auxiliary air conditioning system of this invention is referenced by the reference numeral 34 and is illustrated in FIGS. 1-4. Air conditioning system 34 includes a 12 volt direct current air conditioning condenser and fan 36 which is mounted on the rear side of the rear wall 16 of the sleeper cab 14. Condenser 36 includes a blower fan which draws air forwardly through the condenser 36.

Figure 4:
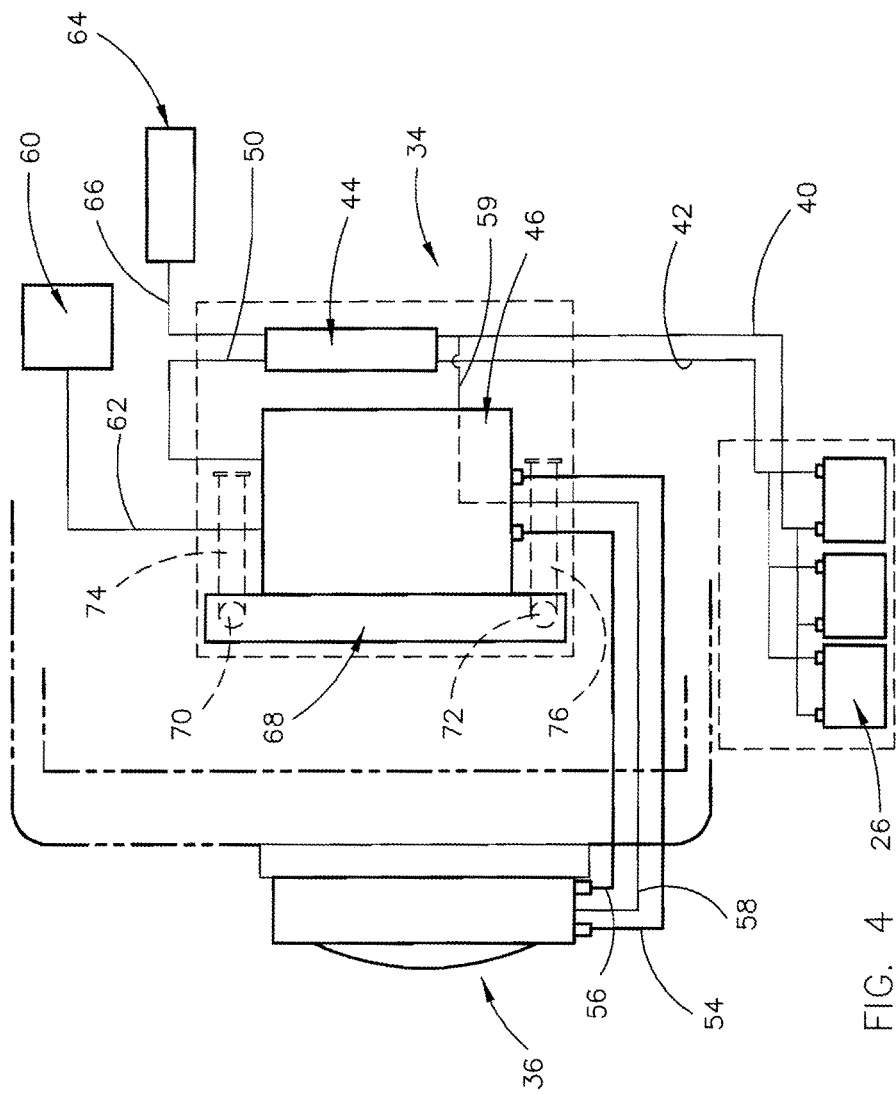
FIG. 4 is a schematic of the first embodiment of the auxiliary air conditioning system of this invention.

As seen in the schematic view of FIG. 4, a positive line or lead 40 extends from the direct current battery system 26 and a negative line or lead 42 extends from direct current battery system 26. Leads 40 and 42 are electrically connected to an inverter 44. Inverter 44 converts the direct current from battery system 26 to alternating current in conventional fashion. Leads 40 and 42 extend through holes in the floor 24 of sleeper cab 14.

The numeral 46 refers to a conventional alternating current air conditioning unit or air unit which is mounted within a housing in conventional fashion. Inverter 44 provides alternating current to air unit 46 by lead 50.

Air conditioning lines 54 and 56 extend from condenser 36 to the air unit 46 as seen in FIG. 4. An electrical lead 58 extends from condenser 36 to the air unit 46. The lines 54 and 56 and the lead 58 extend inwardly into sleeper cab 14 below the floor thereof by way of the openings or holes in the floor 24 of the sleeper cab 14. An electrical lead 59 extends from lead 40 to the air unit 46 which is operatively connected to lead 58 to enable 12 volt direct current power to be supplied to the direct current condenser and fan 36.

The numeral 60 refers to the air unit control which is connected to AC air unit 46 by lead 62. The numeral 64 refers to an inverter control which is connected to the inverter 44 by lead 66.

An air discharge manifold 68 is mounted on the air unit 46 and has a pair of air discharge openings 70 and 72 formed therein in which tubes or conduits 74 and 76 are received. The tubes or conduits 74 and 76 extend into the sleeper cab to cool the interior of the sleeper cab. The tubes or conduits could also be extended into the ductwork of the sleeper cab 14.

As set forth above, the auxiliary air conditioning system 34 is powered by the truck direct current battery system 26 through the use of the inverter 44 which inverts or changes the direct current electricity of the direct current battery system 26 to alternating current to enable the system 34 to function. The air unit control 60 will only actuate the air unit 46 when the truck engine is not running so the air unit 46 will not operate when the truck engine is running. Further, the inverter control 64 will deactivate the inverter 44 upon the voltage in the truck direct current battery system 26 dropping to a predetermined level so that the battery system 26 will be able to start the truck engine.

Figure 5:
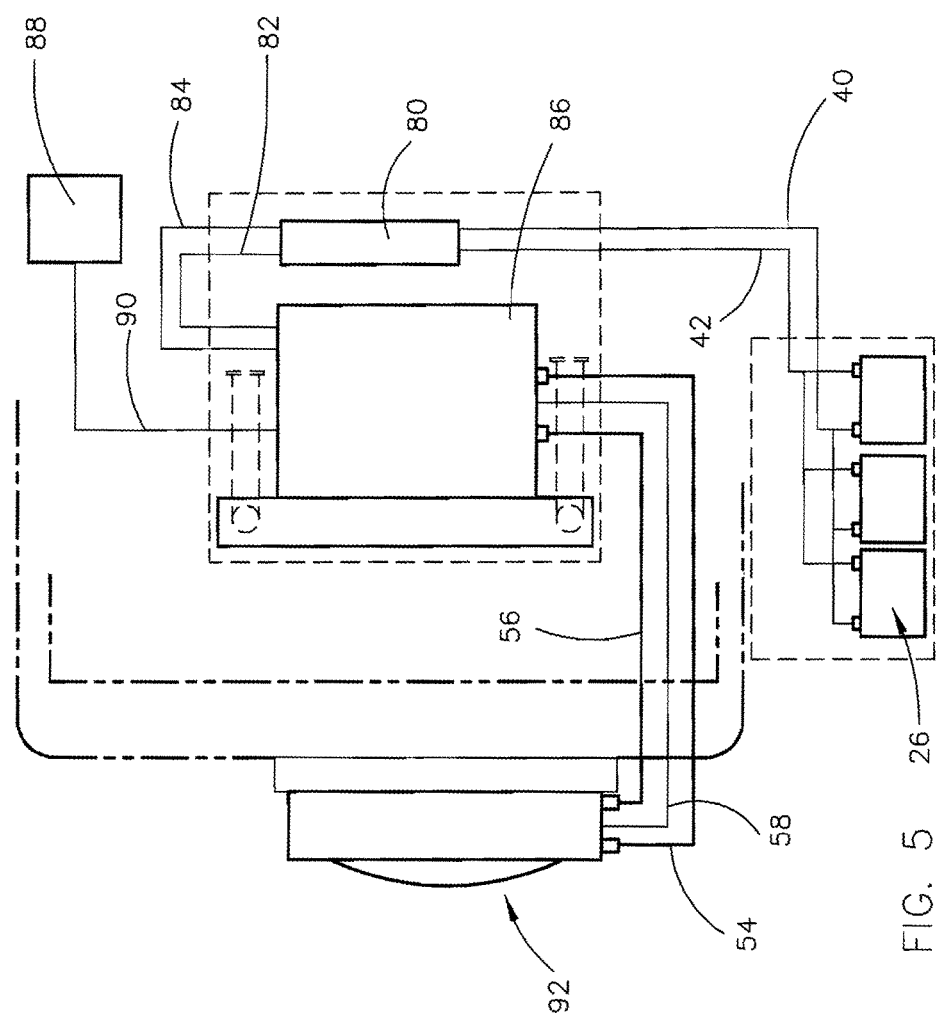
FIG. 5 is a schematic of the second embodiment of the auxiliary air conditioning system of this invention.

A second embodiment of the auxiliary air conditioning system is illustrated in the schematic of FIG. 5. In FIG. 5, the truck battery system 26 supplies direct current to a low voltage controller 80 by leads 40 and 42. Leads 82 and 84 electrically connect the controller 80 to a direct current air conditioner unit 86. A temperature control 88 is connected to air conditioning unit 86 by lead 90. The condenser and fan 92 are direct current driven. Condenser and fan 92 are connected to the air conditioning unit 86 by lines 54 and 56 and lead 58 in the same manner as described with respect to system 34. The low voltage controller 80 deactivates the air conditioner unit 86 and the condenser and fan 92 when the voltage in battery system 26 drops to a predetermined level to ensure that the battery system 26 will have sufficient power to start the truck engine. As in the first embodiment of the invention, the air conditioning unit 86 will only operate when the truck engine is not running.

Thus, it can be seen that a novel auxiliary air conditioning system has been provided which enables a truck driver to be comfortable without idling the truck engine.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. In combination:
    a truck having an engine, a direct current battery system, a conventional air conditioning system operated by the engine, an operator's cab having a rearward end, and a sleeper cab at the rearward end of the operator's cab with the sleeper cab having an interior, a first side wall, a second side wall, a rear wall with interior and exterior sides, a floor, and a bunk bed positioned above the floor of the sleeper cab;

an auxiliary alternating current air conditioning system for supplying cool air to said interior of said sleeper cab only when the truck engine is not running, comprising:

(a) a 12 volt direct current condenser and fan mounted on said exterior side of said rear wall of said sleeper cab;

(b) an alternating current air conditioner unit mounted in said sleeper cab;

(c) said direct current condenser and fan being operatively connected to said alternating current air conditioner unit;

(d) an electrical inverter electrically connected to said direct current battery system which inverts direct current electricity from said direct current battery system of said truck to alternating current electricity;

(e) said inverter being electrically connected to said air conditioner unit which supplies alternating current thereto;

(f) an auxiliary control which is operatively connected to said air conditioner unit which controls the operation of said air conditioner unit;

(g) an inverter control electrically connected to said inverter which controls said inverter;

(h) said air conditioner unit having at least one cool air conduit extending therefrom into said interior of said sleeper cab;

an air manifold positioned on said air conditioning unit and is in communication with said air conditioning unit; and said cool air conduit being in communication with said air manifold.

2. The combination of claim 1 wherein a pair of cool air conduits extend from said air manifold into said interior of said sleeper cab.

\* \* \* \* \*